(12) United States Patent
Kwak et al.

(10) Patent No.: US 8,432,838 B2
(45) Date of Patent: Apr. 30, 2013

(54) METHOD FOR ESTABLISHING TIME DOMAIN STRUCTURE OF A FRAME IN A HETEROGENEOUS TDD SYSTEMS ENVIRONMENT

(75) Inventors: Jin Sam Kwak, Gunpo-Si (KR); Min Seok Noh, Seoul (KR); Dong Cheol Kim, Suwon-si (KR); Sung Ho Moon, Anyang-si (KR); Seung Hee Han, Anyang-si (KR); Hyun Woo Lee, Anyang-si (KR); Yeong Hyeon Kwon, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 12/812,194

(22) PCT Filed: Jan. 23, 2009

(86) PCT No.: PCT/KR2009/000368
§ 371 (c)(1),
(2), (4) Date: Jul. 8, 2010

(87) PCT Pub. No.: WO2009/093868
PCT Pub. Date: Jul. 30, 2009

(65) Prior Publication Data
US 2010/0278083 A1 Nov. 4, 2010

Related U.S. Application Data

(60) Provisional application No. 61/022,824, filed on Jan. 23, 2008.

(30) Foreign Application Priority Data

May 2, 2008 (KR) .......................... 10-2008-0041124

(51) Int. Cl.
*H04J 3/00* (2006.01)
(52) U.S. Cl.
USPC ........................................... 370/280; 370/345
(58) Field of Classification Search .................. None
See application file for complete search history.

(56) References Cited

U.S. PATENT DOCUMENTS

2005/0243745 A1* 11/2005 Stanwood et al. ............ 370/280
2007/0268846 A1* 11/2007 Proctor et al. ................ 370/279

FOREIGN PATENT DOCUMENTS

KR 10-2004-0063059 A 7/2004
KR 10-2005-0107220 A 11/2005
KR 10-2007-0030539 A 3/2007

* cited by examiner

*Primary Examiner* — Jianye Wu
(74) *Attorney, Agent, or Firm* — Birch, Stewart, Kolasch & Birch, LLP

(57) ABSTRACT

Disclosed in a method for establishing a time domain structure of a frame in a heterogeneous TDD systems environment. In other words, in a situation of coexisting heterogeneous systems comprising a first system corresponding to an existing TDD system and a second system corresponding to a new system, a method is provided for establishing a time domain structure of a second frame for the second TDD system mode to enable it to coexist with a first frame for the first TDD (Time Division Duplex) system mode, that comprises obtaining information for the first supported system type and a first ratio between the downlink region and the uplink region of the first frame structure, and then, according to the obtained information, establishing a second ratio between the downlink region and the uplink region of the second frame structure for the second system. Further, particular numerology is provided for said method.

15 Claims, 16 Drawing Sheets

| LCR-TDD 4:3 | D | S | U | U | U | D | D | D | D | S | U | U | U | D | D | D |
| --- | --- | --- | --- | --- | --- | --- | --- | --- | --- | --- | --- | --- | --- | --- | --- | --- |
| LCR-TDD 5:2 | D | S | U | U | D | D | D | D | D | S | U | U | D | D | D | D |
| LCR-TDD 6:1 | D | S | U | D | D | D | D | D | D | S | U | D | D | D | D | D |

METHOD FOR ESTABLISHING TIME DOMAIN STRUCTURE OF A FRAME IN A HETEROGENEOUS TDD SYSTEMS ENVIRONMENT

CROSS REFERENCE TO RELATED APPLICATIONS

This national stage application based on PCT/KR2009/000368 filed Jan. 23, 2009 claims the benefit of U.S. Provisional Application No. 61/022,824 filed on Jan. 23, 2008 and to Patent Application No. 10-2008-0041124 filed in the Republic of Korea, on May 2, 2008. The entire contents of all of the above applications are hereby incorporated by reference.

FIELD OF THE INVENTION

The following description of the present invention relates to a method of establishing a time domain structure of a frame in an environment where heterogeneous TDD systems co-exist.

FIELD BACKGROUND

In case of wideband telecommunications systems, in order to maximize the efficiency of limited wireless (or radio) resources, a number of more effective transmitting and receiving methods in time, space, and frequency domains and the respective application methods have been proposed. Particularly, the multi carrier OFDM method has the advantages of reducing the complexity of a receiving end in a frequency selective fading environment that occurs in a wideband channel and, also, of maximizing spectral efficiency through selective scheduling in a frequency domain by applying different channel characteristics (or attributes) of a subcarrier. Furthermore, by allocating (or assigning) different subcarriers to multiple users, the OFDM method is extendable to an orthogonal frequency division multiple access (OFDMA) method, thereby being capable of enhancing the efficiency of the wireless resource in the frequency domain.

As the WirelessMAN-OFDMA standard adopting the typical OFDMA, IEEE 802.16-2004 and the amended standard IEEE 802.16e–2005 (hereinafter referred to as IEEE 802.16e) have been completed.

FIG. 1 shows a logical frame structure of the IEEE 802.16e system. As shown in FIG. 1, the logical frame structure of the IEEE 802.16e system consists of a preamble (101), an FCH (frame control header) (102), control signal blocks of DL/UL-MAP (103, 104), and data bursts. Also, the data transmission of each user is defined by different subcarrier allocation methods (e.g., PUSC, (O)-FUSC, TUSC, AMC, etc.) depending upon the method of configuring the subcarrier. Herein, various permutation zones may be configured in one frame.

In the frame of the IEEE 802.16e system, as shown in FIG. 1, the reception of an initial preamble (101), an FCH (102), and control information on the DL/UL-MAP (103, 104) is required. And, the role of each field is as follows:

Preamble (101): performing synchronization, channel estimation, cell ID acquisition, etc.

FCH (102): providing channel allocation information and channel code information associated with the DL-MAP (103)

DL/UL-MAP (103, 104): providing channel allocation information of a data burst in an downlink (DL)/uplink (UL)

Among the above-described control fields, with the exception of the preamble (101), the logical frame structure may be diversely configured (or established) in accordance with a subchannel allocation method (PUSC, (O)-FUSC, TUSC, AMC, etc.) selected by taking into consideration factors such as frequency diversity gain, scheduling gain, convenience in adopting a pilot overhead or multi/adaptive antenna.

Meanwhile, discussions of an enhanced version (or system) of the above-described IEEE 802.16e system is in progress, and such system will be regulated as the IEEE 802.16m standard. Accordingly, reference may be made to "IEEE 802.16m-07/002r4—TGM System Requirements Document" (hereinafter referred to as "SRD") for the requirements that the IEEE 802.16m system should satisfy.

Referring to the above-described SRD of the IEEE 802.16m system, it is mentioned that co-existence with the TD-SCMA, 3GPP LTE TDD should be supported in the IEEE 802.16m TDD mode. However, in case of the IEEE 802.16m system, an accurate frame structure has not yet been decided, and, accordingly, discussions on the uplink/downlink ratio and time domain structure of a frame within the IEEE 802.16m system for the co-existence with the heterogeneous TDD system is required to be made.

DETAILED DESCRIPTION OF THE INVENTION

Technical Objects

In order to resolve the above-described problems, the present invention proposes a method of determining a downlink (DL)/uplink (UL) ratio and a method of establishing a time domain structure of other frames so as to prevent collision with a heterogeneous time division duplex (TDD) network when designing the frame structure from occurring, in the aspect of a specific system design.

Technical Solutions

To achieve these objects and other advantages and in accordance with the purpose of the invention, as embodied and broadly described herein, according to an embodiment of the present invention, in a situation of coexisting heterogeneous systems including a first system and a second system, in a method of establishing a time domain structure of a second frame used for a Time Division Duplex (TDD) mode of the second system, so that the second frame can coexist with a first frame for a TDD mode of the first system, the method of establishing a time domain structure of a frame includes an information acquiring step for acquiring type information of the first system being supported and information on a first ratio, wherein the first ratio corresponds to a ratio between an uplink section and a downlink section in the first frame structure; a second frame structure establishing step for establishing a second frame structure for the second system based upon the acquired information; and a ratio determining step for determining a second ratio, wherein the second ratio corresponds to a ratio between an uplink section and a downlink section in the second frame structure.

At this point, the determining step may further include a set-up step of excluding a predetermined number of OFDM symbols from transmission so that a sum of the downlink section and a transmit transition gap (TTG) of the second frame can be equal to or greater than a sum of the downlink section and a downlink pilot time slot (DwPTS) of the first frame.

Also, the determining step may further include a step of establishing a frame offset from a starting point of the first frame of the second frame.

In a more specific embodiment of the present invention, the first system may correspond to an LCR-TDD (low-chip-rate time division duplex) system, and the second system may correspond to an IEEE 802.16m system, and a cyclic prefix (CP) length of the second frame may be equal to ⅛ valid OFDM symbol time (Tu). And, in this case, the second ratio may be set to 7:1 when the first ratio is set to 6:1. The second ratio may also be set to 6:2 when the first ratio is set to 5:2. The second ratio may also be set to 5:3 when the first ratio is set to 4:3. Herein, x:y corresponds to (a downlink section length): (an uplink section length). And, this is identically applied to the following cases.

Also, in the same situation, among the second frame structure, 1 OFDM symbol may be excluded from the transmission when the first ratio is 6:1, and 2 OFDM symbols may be excluded from the transmission when the first ratio is 5:2, and 3 OFDM symbols may be excluded from the transmission when the first ratio is 4:3.

In another more specific embodiment of the present invention, the first system may correspond to a 3GPP LTE TDD system, and the second system may correspond to an IEEE 802.16m system, and a cyclic prefix (CP) length of the second frame may be equal to ⅛ valid OFDM symbol time (Tu). And, in this case, the information acquiring step may include a step of additionally acquiring CP length information of the first frame and configuration index information of the first frame in the 3GPP LTE TDD system.

In this embodiment, when it is assumed that the CP length of the first frame corresponds to a normal CP and that the first ratio is 1:3, the second ratio may be set to 2:6 or 3:5 when the configuration index of the first frame is 0, the second ratio may be set to 3:5 when the configuration index of the first frame is 1, the second ratio may be set to 3:5 when the configuration index of the first frame is 2, the second ratio may be set to 3:5 when the configuration index of the first frame is 3, the second ratio may be set to 3:5 when the configuration index of the first frame is 4, the second ratio may be set to 2:6 or 3:5 when the configuration index of the first frame is 5, the second ratio may be set to 3:5 when the configuration index of the first frame is 6, the second ratio may be set to 3:5 when the configuration index of the first frame is 7, and the second ratio may be set to 3:5 when the configuration index of the first frame is 8.

Also, when it is assumed that the CP length of the first frame corresponds to a normal CP and that the first ratio is 2:2, the second ratio may be set to 4:4 when the configuration index of the first frame is 0, the second ratio may be set to 5:3 when the configuration index of the first frame is 1, the second ratio may be set to 5:3 when the configuration index of the first frame is 2, the second ratio may be set to 5:3 when the configuration index of the first frame is 3, the second ratio may be set to 5:3 when the configuration index of the first frame is 4, the second ratio may be set to 4:4 when the configuration index of the first frame is 5, the second ratio may be set to 5:3 when the configuration index of the first frame is 6, the second ratio may be set to 5:3 when the configuration index of the first frame is 7, and the second ratio may be set to 5:3 when the configuration index of the first frame is 8.

Also, when it is assumed that the CP length of the first frame corresponds to a normal CP and that the first ratio is 3:1, the second ratio may be set to 6:2 when the configuration index of the first frame is 0, the second ratio may be set to 6:2 when the configuration index of the first frame is 1, the second ratio may be set to 6:2 when the configuration index of the first frame is 2, the second ratio may be set to 7:1 when the configuration index of the first frame is 3, the second ratio may be set to 7:1 when the configuration index of the first frame is 4, the second ratio may be set to 6:2 when the configuration index of the first frame is 5, the second ratio may be set to 6:2 when the configuration index of the first frame is 6, the second ratio may be set to 7:1 or 6:2 when the configuration index of the first frame is 7, and the second ratio may be set to 7:1 when the configuration index of the first frame is 8.

In such cases, when the configuration index of the first frame is 7 and when the second ratio is 6:2, the second frame may be set-up to be delayed for a predetermined time starting from the starting point of the first frame within a receive transition gap (RTG) range.

Meanwhile, when it is assumed that the CP length of the first frame corresponds to an extended CP and that the first ratio is 1:3, the second ratio may be set to 3:5 when the configuration index of the first frame is any one of 0 to 6.

Also, when it is assumed that the CP length of the first frame corresponds to an extended CP and that the first ratio is 2:2, the second ratio may be set to 4:4 when the configuration index of the first frame is 0 or 6, and the second ratio may be set to 5:3 when the configuration index of the first frame is any one of 1, 2, 3, 5, and 6.

Furthermore, when it is assumed that the CP length of the first frame corresponds to an extended CP and that the first ratio is 3:1, the second ratio may be set to 6:2 or 7:1 when the configuration index of the first frame is 0, the second ratio may be set to 6:2 or 7:1 when the configuration index of the first frame is 1, the second ratio may be set to 7:1 when the configuration index of the first frame is 2, the second ratio may be set to 7:1 when the configuration index of the first frame is 3, the second ratio may be set to 6:2 when the configuration index of the first frame is 4, the second ratio may be set to 6:2 when the configuration index of the first frame is 5, and the second ratio may be set to 7:1 when the configuration index of the first frame is 6.

Advantageous Effects

When carrying out the above-described embodiments of the present invention, in the aspect of the design of a specific system, the DL/UL ratio of a frame structure and the establishment of other time domains may be determined (or set-up) so as to prevent (or minimize) the occurrence of a collision with a heterogeneous time division duplex (TDD) network.

BEST MODE FOR CARRYING OUT THE INVENTION

Figure 1:
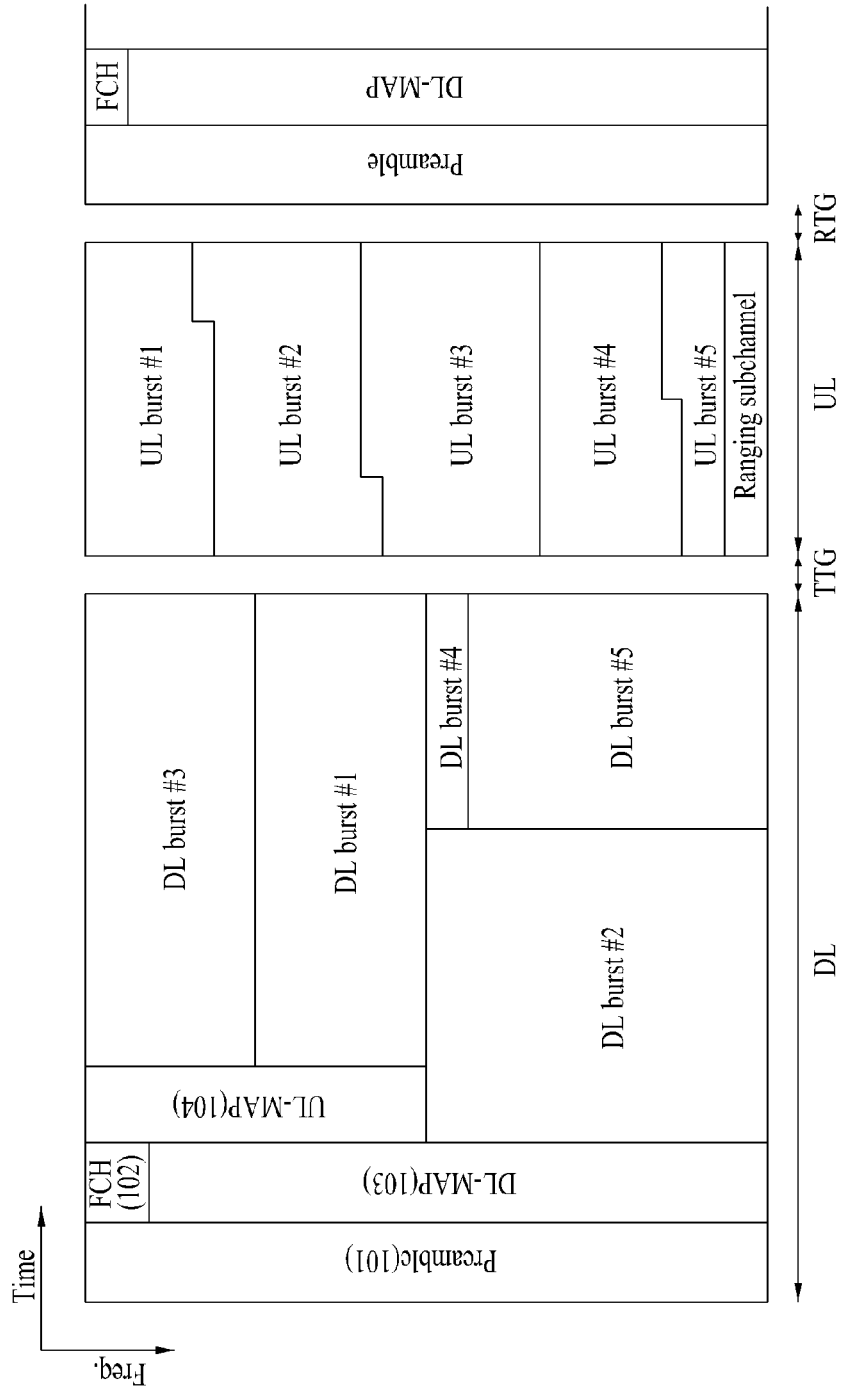
FIG. 1 illustrates a logical frame structure of an IEEE 802.16e system.

Hereinafter, the preferred embodiments of the present invention will be described in detail with reference to the accompanying drawings. The purpose of the following disclosure of the detailed description of the present invention with reference to the accompanying drawings is to provide exemplary descriptions of the embodiments of the present invention, and not to provide the sole and unique embodiments that can be carried out according to the present invention. The following detailed description of the present invention includes detailed specifications in order to provide a full understanding of the present invention. However, it is apparent to anyone skilled in the art that the present invention may be carried out without such detailed specifications.

Meanwhile, in some cases, in order to avoid any ambiguity in the concept of the present invention, the disclosure of some structures and devices may be omitted, or such structures and devices may be illustrated in the form of a single block based upon the essential functions of each structure and device. Furthermore, the same reference numerals will be used for the same elements of the present invention throughout the description of the present invention.

The following description of the present invention will mainly focus on the method of determining a downlink (DL)/ uplink (UL) ratio and the method of establishing a time domain structure of other frames, so as to prevent collision with a heterogeneous time division duplex (TDD) network, e.g., TD-SCMA system or 3GPP LTE TDD system from occurring, when designing the frame structure, in the aspect of a specific system design. However, the basic principle for supporting the TDD system without any collision with a heterogeneous TDD system may also be applied in other systems by using the same method.

In order to maintain the DL/UL switch-point according to the DL/UL ratio of the heterogeneous system supporting the TDD mode, it is preferable that the DL/UL alignment according to the DL/UL ratio of a newly designed system matches with (or is identical to) the aligned state (or alignment) of the conventional heterogeneous system. If the time domain alignment with the conventional heterogeneous system is not identical (or does not match), an interference may occur between the systems, thereby causing a deterioration in the performance of the systems. In order to avoid such problems, an idle OFDM symbol sections that does not transmit any OFDM symbols may be assigned. Also, an excessive number of such idle OFDM symbols may cause damage in the overall performance of the system.

In order to minimize such disadvantages, an adequate Dl/UL ratio is required to be set-up (or determined) in a newly designed system according to the DL/UL ratio in the conventional heterogeneous TDD system.

Figure 2:
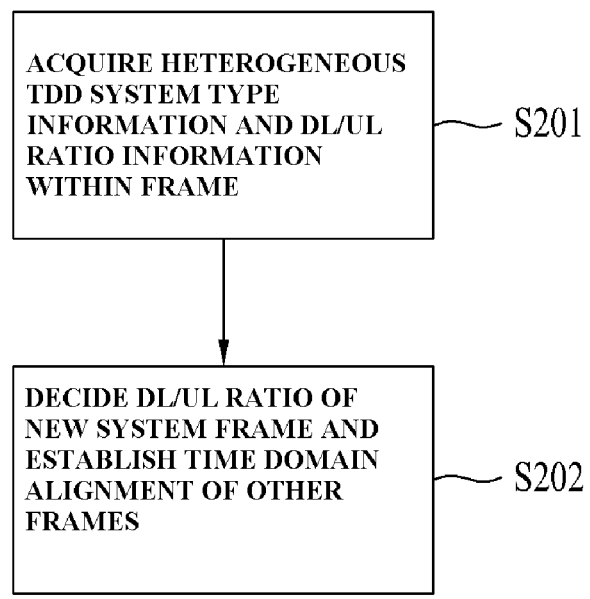
FIG. 2 illustrates a flow chart introducing a method of establishing a DL/UL ratio of a new system and a method of establishing the time domain of other frames according to an embodiment of the present invention.

FIG. 2 illustrates a flow chart introducing a method of establishing a DL/UL ratio of a new system and a method of establishing the time domain of other frames according to an embodiment of the present invention.

As shown in FIG. 2, in a coexisting situation with the conventional heterogeneous TDD system, when establishing a frame structure for the TDD mode of the new system, type information of the conventional heterogeneous TDD system and information of the DL/UL ratio within the frame of the conventional TDD system are required to be acquired (S201). The conventional TDD system that is to coexist with the newly designed system is pre-decided when installing the newly designed system, so as to be stored in advance in each subject (e.g., base station, mobile station, etc.) of the new system. However, depending upon the situation, since each subject may be set-up in different environments, it is preferable to determine such information as upper-layer (or higher-layer) information that can be acquired based upon a specific cycle period or when a change occurs.

For example, the base station or user equipment supporting the IEEE 802.16m may acquire information on whether the conventional heterogeneous TDD system corresponds to an LCR-TDD (low-chip-rate time division duplex) system respective to a TD-SCDMA system or whether the conventional heterogeneous TDD system corresponds to a 3GPP LTE TDD system. Also, information on what the DL/UL ratio is in the frame structure according to each system may also be acquired. Furthermore, as described below, in case of the 3GPP LTE TDD system, since different TDD frames are used in accordance with the type of cyclic prefix (hereinafter referred to as "CP") within each frame and the frame structure index, the respective information should be acquired so that the time domain frame structure of the new system (IEEE 802.16m) can be established without any collision with the conventional system.

After acquiring such information on the conventional system, the DL/UL ratio of the new frame and the time domain alignment of other frames may be set-up (or determined) in accordance with such acquired information (S202). According to an embodiment of the present invention, apart from the set-up of the DL/UL ratio of each frame, a frame offset is proposed as the time domain alignment that is to be established. More specifically, in some particular cases, the frame of the new system may be established so that specific information can be delayed in comparison with the conventional system without any collision with the conventional the conventional heterogeneous TDD system.

More particularly, in order to provide support without causing any collision between the conventional heterogeneous TDD system and the new system, the sum (or added value) of the downlink section of the new system frame and the transmit transition gap (TTG) is required to be set-up so as to be greater than or equal to the sum (or added value) of downlink section of the conventional TDD system frame and a downlink pilot time slot (DwPTS). If a first location corresponding to the sum (or added value) of the downlink section of the new system frame and the transmit transition gap (TTG) is later than (or comes after) a second location corresponding to the sum (or added value) of downlink section of the conventional TDD system frame and a downlink pilot time slot (DwPTS), the OFDM symbols corresponding to the first location to the second location cannot be used for transmission in the new system frame. Under such assumption, in the above-described embodiment of the present invention, by delaying the new system frame by a predetermined interval in comparison with the starting point of the conventional TDD system, the first location may be set to be positioned at the same location as the second location or at a location after the second position. And, in this case, the last portion of the frame in the tome domain may use the receive transition gap (RTG). More specific details will be described in the following detailed description of the exemplary embodiment of each system.

Meanwhile, as described above, for the coexistence with the conventional heterogeneous TDD system, consideration is required to be made as to how the frame structure of the IEEE 802.16m system will be established. More specifically, in case of the IEEE 802.16m, it is very likely to support CP lengths having diverse sizes. Since there in a difference in OFDM symbols that can be used in accordance with the CP length, this may influence the DL/UL ratio according to the present invention.

Therefore, hereinafter, the CP length of the IEEE 802.16m system will now be described in detail.

First of all, the basic OFDM value regulation in the conventional IEEE 802.16e system is as follows.

TABLE 1

| Transmission Bandwidth(MHz) | 5 | 10 | 20 |
|---|---|---|---|
| Sampling Frequency(MHz) | 5.6 | 11.2 | 22.4 |
| FFT size | 512 | 1024 | 2048 |
| Sub-Carrier Spacing (kHz) | 10.94 | 10.94 | 10.94 |
| Tu (us) | 91.4 | 91.4 | 91.4 |

| Cyclic Prefix (CP) length | TS (us) | OFDM Symbols per Frame | Idle Time (us) |
|---|---|---|---|
| Tg = ¼ Tu | 91.4 + 22.85 = 114.25 | 43 | 87.25 |
| Tg = ⅛ Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

Table 1 shows the basic OFDM value regulation on the transmission bandwidth, sampling frequency, FFT size, and sub-carrier spacing, and so on, in the conventional IEEE 802.16e system. Table 1 also shows the available CP lengths and the respective number of OFDM symbols per frame and idle time. Herein, "Tu" indicates the valid OFDM symbol length, and this may be defined as 1/(sub-carrier spacing).

Among the CP lengths ¼ Tu, ⅛ Tu, 1/16 Tu, and 1/32 Tu regulated in the conventional IEEE 802.16e, as shown in Table 1, the CP length required to be supported in the legacy mode of the new system corresponds to the CP length ⅛ Tu, and this is marked in bold font in Table 1 (see IEEE 802.16m-07/02r4—TGm System Requirements Document (SRD)). Also, in the following description of the present invention, the "legacy support mode" or "legacy mode" indicates the mode supporting the communications method regulated as a fundamental standard in the IEEE 802.16e system required in the SRD.

As described above, when using the ⅛ Tu CP length, as shown in Table 1, 48 OFDM symbols and an idle time of 64.64 us are included in a 5 msec frame. Therefore, in case of a new frame structure coexisting with the new mode, and, more particularly, in case of a frame structure supporting the legacy mode, a new frame structure is required to be proposed under the conditions of the basic values.

Accordingly, in the following description, it will be assumed that the CP length of the IEEE 802.16m system corresponds to ⅛ Tu.

Figure 3:
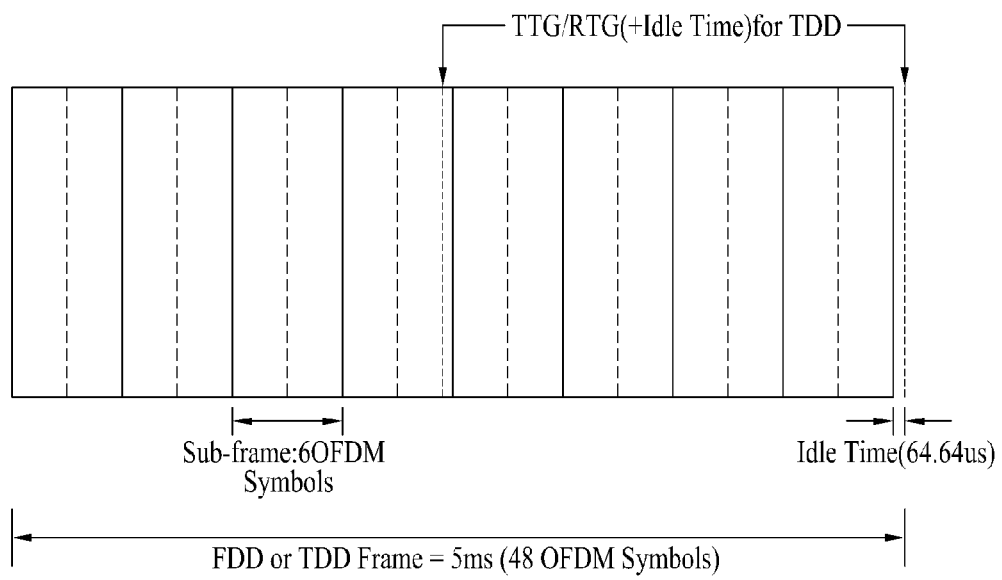
FIG. 3 illustrates a frame structure having a CP length of ⅛ Tu, which is proposed for a legacy support mode of the IEEE 802.16m according to an embodiment of the present invention.

FIG. 3 illustrates a frame structure having a CP length of ⅛ Tu, which is proposed for a legacy support mode of the IEEE 802.16m according to an embodiment of the present invention.

As shown in FIG. 3, in the frame structure for the legacy support mode of the IEEE 802.16m, a basic sub-frame consists of 6 OFDM symbols, and one frame is configured of 48 OFDM symbols and an idle time of 64.64 us. In this structure, by configuring the TTG and RTG by using one OFDM symbol and the idle time of the DL region, the TDD mode may be supported.

Hereinafter, it is assumed that the new system corresponds to the IEEE 802.16m system based upon the above-described structure, and an example of establishing a frame enabling the LCR-TDD system and the 3GPP LTE TDD system to be supported without any collision will also be described.

Coexistence with the LCR-TDD System

Figures 4, 5:
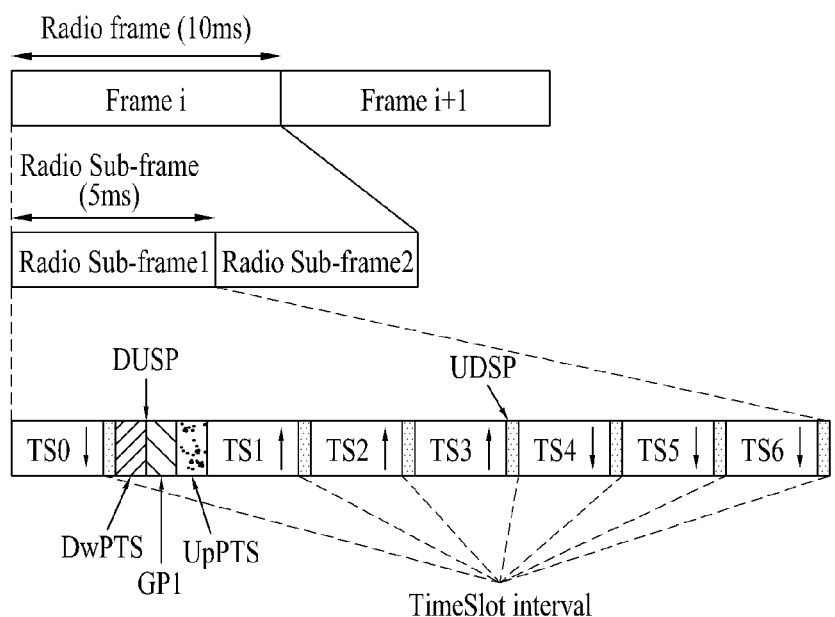
FIG. 4 illustrates a frame structure according to an exemplary DL/UL ratio of an LCR-TDD system.
FIG. 5 illustrates a drawing describing the DL/UL ratio available in the LCR-TDD system.

FIG. 4 illustrates a frame structure according to an exemplary DL/UL ratio of an LCR-TDD system.

As shown in FIG. 4, one radio (or wireless) frame in the LCR-TDD system consists of 7 traffic slots (TS0~TS6), and the length of each traffic slot is 0.675 ms. The DwPTS, GP, and UpPTS are sequentially configured between TS0 and TS1, and these are used for the UL and DL synchronization and the guard period. The DwPTS, the GP, and the UpPTS have the length of 75 us, 75 us, and 125 us, respectively.

The available DL/UL ratios using 7 symbols within the frame according to the LCR-TDD system are 6:1, 5:2, and 4:3. The concept of each DL/UL ratio is as shown in FIG. 5. FIG. 5 illustrates a drawing describing the DL/UL ratio available in the LCR-TDD system. And, the portion marked in dark shading specifies the DL/UL ratio by indicating a DL and UL pair.

When considering the coexistence of the above-described LCR-TDD system and the IEEE 802.16m TDD system, it is preferable that, in the IEEE 802.16m TDD mode, the DL/UL ratio of the IEEE 802.16m is decided based upon the DL/UL ratio of the LCR-TDD. At least one or more IEEE 802.16m DL/UL ratio may be determined with respect to one DL/UL ratio of the LCR-TDD. If non-conformity in the time alignment occurs between the two systems, a specific OFDM symbol may not be used in the transmission. According to the embodiment of the present invention, in order to minimize the number of OFDM symbols that cannot be used in the transmission, a method of determining (or setting-up) the DL/UL ratio of the IEEE 802.16m frame based upon each of the DL/UL ratios of the conventional LCR-TDD system may be proposed as shown below.

TABLE 2

TD-SCDMA DL/UL Ratio

| 6:1 | 5:2 | 4:3 |
|---|---|---|

CP length for IEEE 802.16 m system

| 1/8 Tu | 1/8 Tu | 1/8 Tu |
|---|---|---|

DL/UL ratio for IEEE 802.16 m TDD within 5 ms frame, number of OFDM symbols being punctured within 5 ms frame, frame offset, etc.

| Frame Offset: 675 * 2 + DwPTS + GP = 1625 us | 0.675 * 6 * 1000 + DwPTS + GP = 4200 us | 7:1 4215.6 (DL-41) 4112.8 (DL-40) 41-40 = 1symbol | Frame Offset: 675 * 3 + DwPTS + GP = 2300 us | 0.675 * 5 * 1000 + DwPTS + GP = 3525 us | 6:2 3598.7 (DL-35) 3393.1 (DL-33) 35-33 = 2symbols | Frame Offset: 675 * 4 + DwPTS + GP = 2975 us | 0.675 * 4 * 1000 + DwPTS + GP = 2850 us | 5:3 3084.6 (DL-30) 2776.1 (DL-27) 30-27 = 3symbols |

In Table 2, it is assumed that each of the DwPTS, the GP, and the UpPTS respectively corresponds to 75 us, 75 us, and 125 us.

As shown in Table 2, when the DL/UL ratio of the LCR-TDD system is 6:1, and when considering the situation wherein the DL(us) or the DL+TTG(us) of the IEEE 802.16m TDD should be equal to or greater than the DL+DwPTS (us) of the LCR-TDD, when the ratio of the IEEE 802.16m is 7:1, the configuration may be made without transmitting a maximum of only 1 OFDM symbol. In all of the cases shown below, the basic condition that the DL(us) or the DL+TTG (us) of the 16m TDD is equal to or greater than the DL+DwPTS (us) of another TDD system. When considering another ratio of the 16m, a situation where at least one or more OFDM symbols are not transmitted may occur. Therefore, when the ratio of the LCR-TDD is 6:1, 7:1 becomes the optimal ratio of the 16m. Based upon the same principle, with respect to the other ratios of the LCR-TDD, when considerations are made outside of the range of ratios mentioned in Table 2, a larger number of OFDM symbols may not be used.

Figure 6:
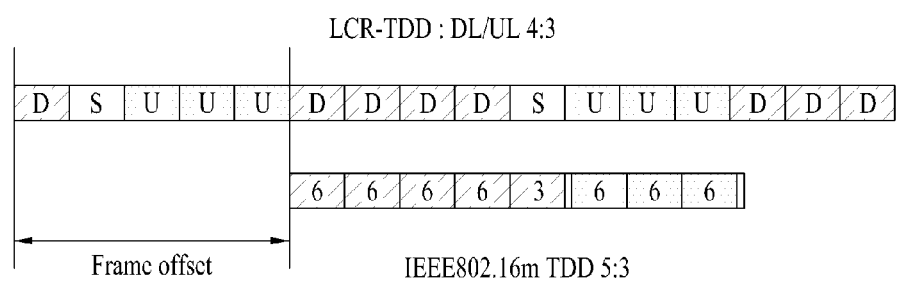
FIG. 6 illustrates a positional relation between a case wherein the DL/UL ratio of the LCR-TDD system shown in FIG. 5 corresponds to 4:3 and the IEEE 802.16m system having the structure shown in Table 2 according to an embodiment of the present invention.

FIG. 6 illustrates a positional relation between a case wherein the DL/UL ratio of the LCR-TDD system shown in FIG. 5 corresponds to 4:3 and the IEEE 802.16m system having the structure shown in Table 2 according to an embodiment of the present invention.

As shown in FIG. 4, when the DL/UL ratio of the LCR-TDD is 4:3, the positional relation of the 16m may be indicated in accordance with Table 2. Also, in case of other DL/UL ratios of the LCR-TDD, such as 5:2 and 6:1, the respective positional relation may be indicated by using the same method shown in FIG. 6. Herein, each ratio may have the respective relation shown in Table 2.

Coexistence with the 3GPP LTE TDD System

Figure 7:
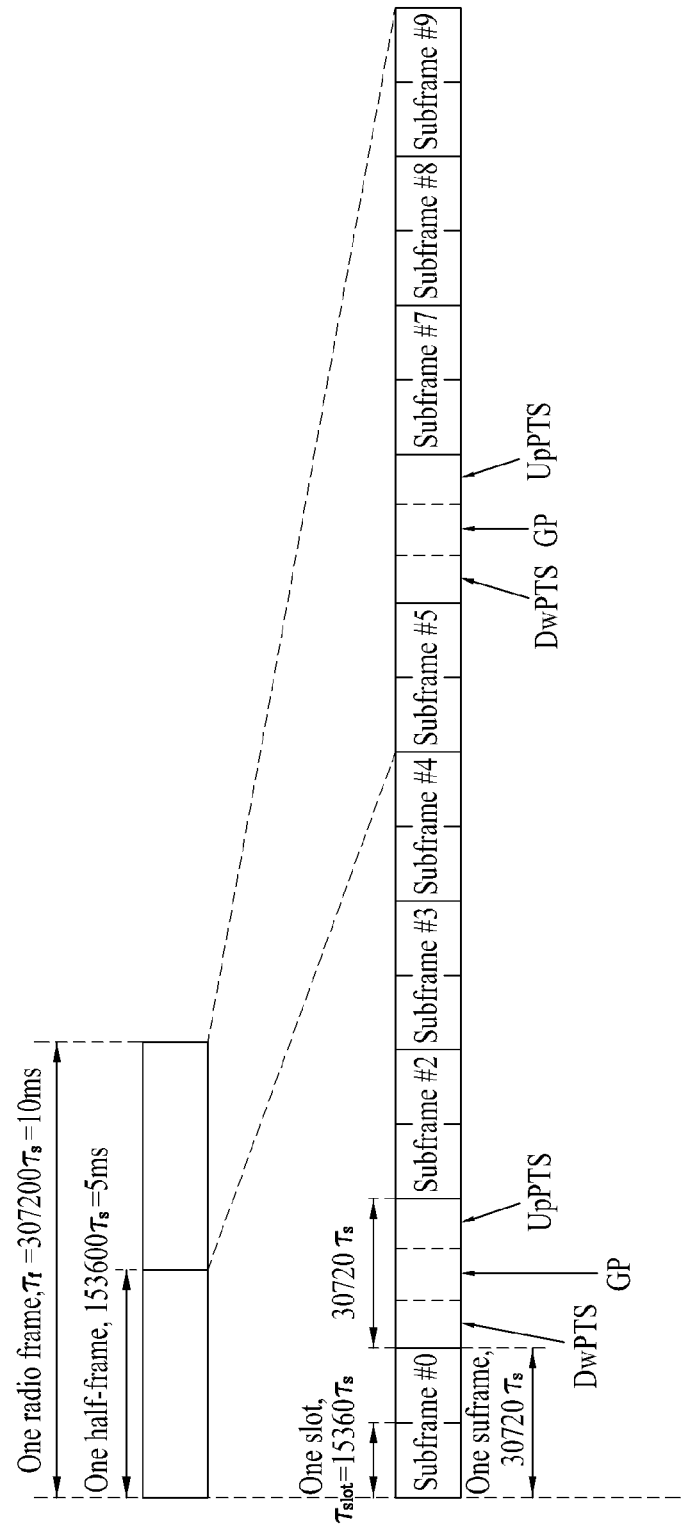
FIG. 7 illustrates a frame structure (Type 2 frame structure) supporting the TDD mode in a 3GPP LTE system.

FIG. 7 illustrates a frame structure (Type 2 frame structure) supporting the TDD mode in a 3GPP LTE system.

The frame structure shown in FIG. 7 corresponds to a case where the frame structure has a 5 ms switch-point cycle period, and reference may be made to 3GPP TS 36.211 for the corresponding details.

As shown in FIG. 7, in the 3GPP LTE system, a radio (or wireless) frame has the length of 10 ms. One radio frame is configured of 2 half-frames. Herein, one half-frame is equal to 5 ms, and each half-frame is configured of 5 sub-frames each having the length of 1 ms. One sub-frame includes one switch-point. This corresponds to when the cycle period of the switch-point is 5 ms. Herein, the cycle period of the switch-point may also be equal to 10 ms.

In this embodiment of the present invention, the case where the cycle period of the switch-point is 5 ms is first considered. As shown in Table 3 below, the frame configuration of the 3GPP LTE TDD mode may respectively have 9 different configurations or 7 different configurations in two different modes, wherein one corresponds to using a normal CP and the other corresponds to using an extended CP.

TABLE 3

| | Normal cyclic prefix | | | Extended cyclic prefix | | |
|---|---|---|---|---|---|---|
| Configuration | DwPTS | GP | UpPTS | DwPTS | GP | UpPTS |
| 0 | 6592 Ts | 21936 Ts | 2192 Ts | 7680 Ts | 20480 Ts | 2560 Ts |
| 1 | 19760 Ts | 8768 Ts | | 20480 Ts | | |
| 2 | 21952 Ts | 6576 Ts | | 23040 Ts | 5120 Ts | |
| 3 | 24144 Ts | 4384 Ts | | 25600 Ts | 2560 Ts | |
| 4 | 26336 Ts | 2192 Ts | | 7680 Ts | | 5120 Ts |
| 5 | 6592 Ts | 19744 Ts | 4384 Ts | 20480 Ts | 5120 Ts | |
| 6 | 19760 Ts | | | 23040 Ts | | |
| 7 | 21952 Ts | 4384 Ts | | — | — | — |
| 8 | 24144 Ts | 2192 Ts | | — | — | — |

In this embodiment of the present invention, a method of establishing DL/UL ratios of the frame for the IEEE 802.16m TDD system and establishing the time domain structure of a frame based upon the 3GPP LTE TDD frame structure shown in FIG. 7 and each configuration index of Table 3 is provided. According to the embodiment of the present invention, the details shown in Table 3 with respect to the 3GPP LTE TDD system propose the regulations for establishing the DL/UL ratios of the IEEE 802.16m and the time domain of a frame in Table 4a, Table 4B, and Table 5 shown below with respect to the case of using a normal CP and an extended CP.

First of all, the case of using a normal CP in the 3GPP LTE system will now be described.

TABLE 4a

| | | | | LTE TDD DL/UL Ratio | | | | | | | |
|---|---|---|---|---|---|---|---|---|---|---|---|
| | | | | 1:3 (6:3) | | 2:2 (7:2) | | | 3:1 (8:1) | | |
| | | | | CP length for IEEE 802.16 m TDD system | | | | | | | |
| | | | | 1/8 Tu | | 1/8 Tu | | | 1/8 Tu | | |
| | The number of | | | DL/UL ratio within IEEE 802.16 m TDD 5 ms frame and number of OFDM symbols being punctured within 5 ms frame | | | | | | | |
| | OFDM symbols in LTE TDD with normal CP | | | DL (1sym) + DwPTS + | | DL (2sym) + DwPTS + | | | DL (3sym) + DwPTS + | | |
| Configuration Index | DwPTS | GP | UpPTS | GP | | GP | | | GP | | |
| 0 | 3 (214.58 us) | 10 | 1 | Frame Offset: 0 us | 1928.64 us | 2:6 1131 (DL) None 3:5 1747.9 (DL) None | Frame Offset: 400 us | 2928.64 us | 4:4 (24:24) 2364.9 (DL) None | Frame Offset: 3000 us | 3928.64 us | 6:2 3598.7 (DL) None |
| 1 | 9 (643.23 us) | 4 | 1 | | 1928.65 us | 3:5 1747.9 (DL) None | | 2928.64 us | 5:3 (30:18) 2981.8 (DL) One | | 3928.65 us | 6:2 3598.7 (DL) None |
| 2 | 10 (714.58 us) | 3 | 1 | | 1928.65 us | 3:5 None | | 2928.65 us | 5:3 2981.8 (DL) One | | 3920.65 us | 6:2 3598.7 (DL) None |
| 3 | 11 (765.94) | 2 | 1 | | 1928.65 us | 3:5 None | | 2928.65 us | 5:3 2981.8 (DL) One | | 3926.65 us | 7:1 3907.1 (DL) Three |
| 4 | 12 (857.29) | 1 | 1 | | 1928.65 us | 3:5 None | | 2928.65 us | 5:3 2981.8 (DL) One | | 3928.65 us | 7:1 3907.1 (DL) Three |

TABLE 4b

| | | | | LTE TDD DL/UL Ratio | | | | | | | |
|---|---|---|---|---|---|---|---|---|---|---|---|
| | | | | 1:3 (6:3) | | 2:2 (7:2) | | | 3:1 (8:1) | | |
| | | | | CP length for IEEE 802.16 m TDD system | | | | | | | |
| | | | | 1/8 Tu | | 1/8 Tu | | | 1/8 Tu | | |
| | The number of | | | DL/UL ratio within IEEE 802.16 m TDD 5 ms frame and number of OFDM symbols being punctured within 5 ms frame | | | | | | | |
| | OFDM symbols in LTE TDD with normal CP | | | DL (1sym) + DwPTS + | | DL (2sym) + DwPTS + | | | DL (3sym) + DwPTS + | | |
| Configu | DwPTS | GP | UpPTS | GP | | GP | | | GP | | |
| 5 | 3 (214.58 us) | 9 | 2 | Frame Offset: 0 us | 1857.29 us | 3:5 None 2:6 1131 (DL) None | Frame Offset: 4000 us | 2857.29 us | 4:4 2364.9 (DL) None | Frame Offset: 3000 us | 3857.29 us | 6:2 3598.7 (DL) None |
| 6 | 9 (643.23 us) | 3 | 2 | | 1857.29 us | 3:5 None | | 2857.29 us | 5:3 2776.1 (DL) Two | | 3857.29 us | 6:2 3598.7 (DL) None |
| 7 | 10 (714.58 us) | 2 | 2 | | 1857.29 us | 3:5 None | | 2857.29 us | 5:3 2776.1 (DL) Two | | 3857.29 us | 7:1 3804.3 (DL) Four 6:2 11.1 us delay + 35sym * |

TABLE 4b-continued

| | | | | LTE TDD DL/UL Ratio | | | | |
|---|---|---|---|---|---|---|---|---|
| | | | | 1:3 (6:3) | 2:2 (7:2) | | 3:1 (8:1) | |
| | | | | | CP length for IEEE 802.16 m TDD system | | | |
| | | | | 1/8 Tu | 1/8 Tu | | 1/8 Tu | |
| | | | | | DL/UL ratio within IEEE 802.16 m TDD 5 ms frame and | | | |
| | The number of | | | | number of OFDM symbols being punctured within 5 ms frame | | | |
| | OFDM symbols in LTE TDD with normal CP | | | DL (1sym) + DwPTS + | DL (2sym) + DwPTS + | | DL (3sym) + DwPTS + | |
| Configu | DwPTS | GP | UpPTS | GP | GP | | GP | |
| 8 | 11 (765.94) | 1 (71.35) | 2 (142.71) | 1857.29 us | 3:5 None | 2857.29 us | 5:3 2776.1 (DL) Two | 3857.29 us | 7:1 3804.3 (DL) Four | 102.82 + 105 = 3714.8us (delay + DL + TDD) None |

Table 4a and Table 4b respectively show the method of determining the DL/UL ratio of the IEEE 802.16m frame according to each configuration index, when the 3GPP LTE TDD system uses the general CP. As shown in Table 4a and Table 4b, or more DL/UL ratios may be available under the same condition. Along with the Dl/UL ratio of the 16m frame, Table 4a and Table 4b show the number of OFDM symbols that cannot be used due to the non-conformity of the two systems.

When the DL/UL ratio of the 3GPP LTE TDD is 1:3, the 16m does not have a separate frame offset. And, the configurations 0 and 5 of Table 4 may configure 2 different ratios 2:6 and 3:5, with respect to the DL/UL ratio 1:3 of the LTE TDD system, without any separate symbol puncturing (i.e., the act of not transmitting specific symbols from a sub-frame of a 6 OFDM symbol unit). In the remaining cases, only one ratio 3:5 is optimal for the DL/UL ratio 1:3 of the LTE TDD system. With the exception of this ratio, when other ratios are being considered, the occurrence of the above-described symbol puncturing should be taken into consideration.

When the DL/UL ratio of the LTE TDD system is 2:2, the frame offset of the 16m becomes the sub-frame unit 4000 us, and only one ratio may be available for all configurations of Table 4. In this case, as described above, the number of symbols processed with puncturing starts from one to a maximum number of two symbols.

When the DL/UL ratio of the LTE TDD system is 3:1, the frame offset of the 16m becomes the sub-frame unit 3000 us, and only one ratio may be available for all configurations of Table 4 with the exception of configuration 7. In this case, the number of puncturing symbols ranges from a minimum of 3 symbols and a maximum of 4 symbols. Herein, since the case of configuration 7 corresponds to a particular case, the description of the same will be given in the following description.

FIG. 8 to FIG. 13 illustrate the relation with an IEEE 802.16m frame, when the LTE TDD DL/UL ratio of Table 4 according to an embodiment of the present invention corresponds to 1:3, and when configuration 0 to configuration 5 are used.

The maximum portion that can be occupied by the DL portion of the 16m frame is up to the length of DL 1 symbol+ DwPTS+GP of the LTE TDD. When the 16m frame exceeds this region, a particular situation of having to perform puncturing on the corresponding symbol occurs. However, when configuration is made as shown in Table 4 according to the embodiment of the present invention, the situation wherein the symbol puncturing is to be performed may not be occurred when the LTE TDD DL/UL ratio corresponds to 1:3.

Figure 8:
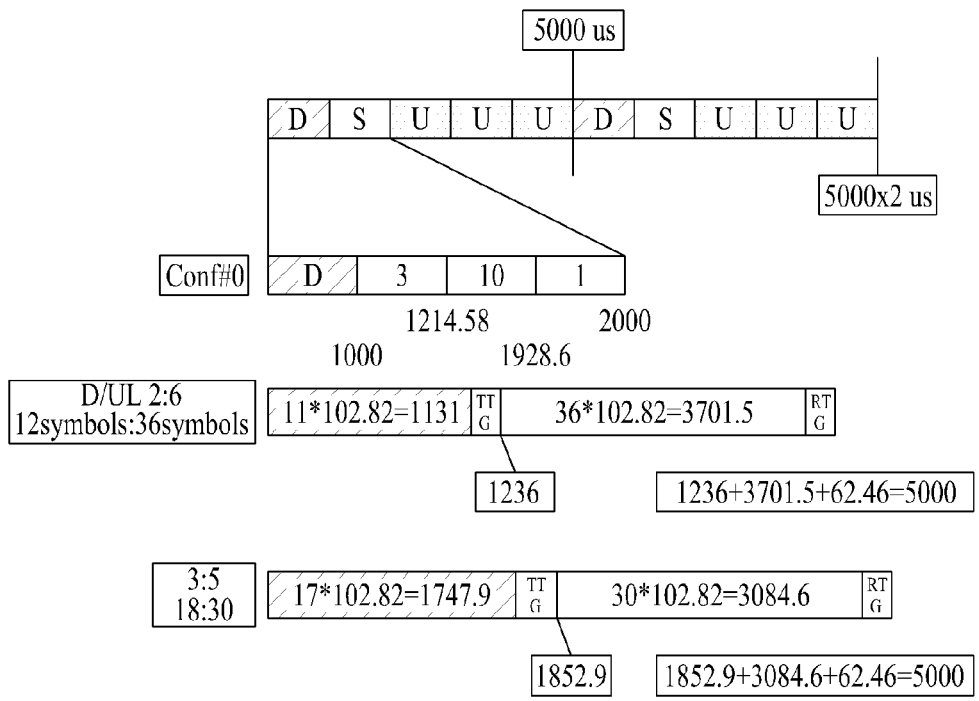
FIG. 8 to FIG. 13 illustrate the relation with an IEEE 802.16m frame, when the LTE TDD DL/UL ratio of Table 4 according to an embodiment of the present invention corresponds to 1:3, and when configuration 0 to configuration 5 are used.
Figure 9:
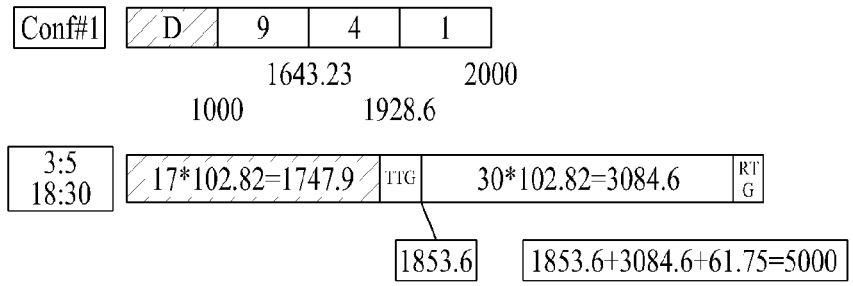
Figure 10:
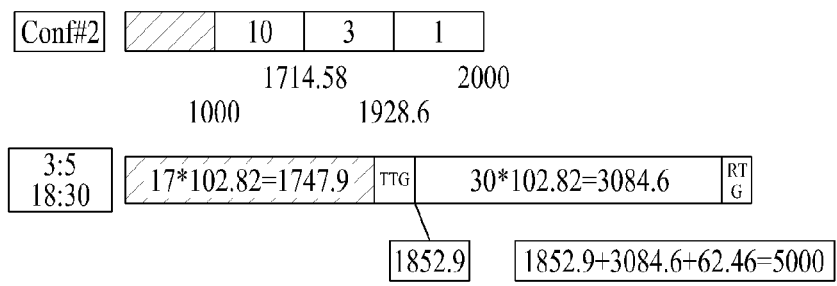
Figure 11:
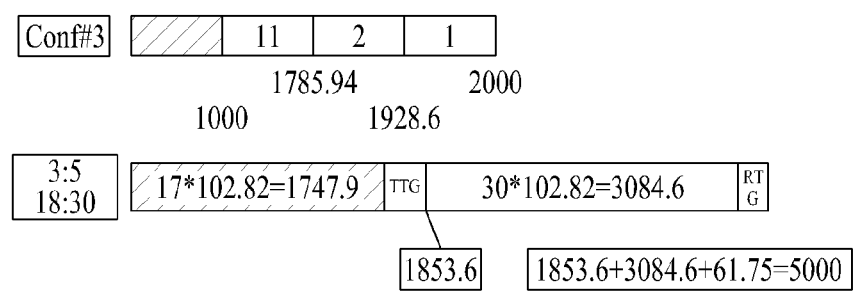
Figure 12:
Figure 13:

FIG. 8 to FIG. 13 all correspond to cases where the DL/UL ratio of the LTE TDD frame is 1:3. Most particularly, FIG. 8 illustrates a situation where the DL/UL ratio of the 16m TDD frame is set to 2:6 and 3:5 with respect to LTE TDD configuration 0. FIG. 9 illustrates a situation where the DL/UL ratio of the 16m TDD frame is set to 3:5 with respect to LTE TDD configuration 1. FIG. 10 illustrates a situation where the DL/UL ratio of the 16m TDD frame is set to 3:5 with respect to LTE TDD configuration 2. FIG. 11 illustrates a situation where the DL/UL ratio of the 16m TDD frame is set to 3:5 with respect to LTE TDD configuration 3. Also, FIG. 12 illustrates a situation where the DL/UL ratio of the 16m TDD frame is set to 3:5 with respect to LTE TDD configuration 4. And, finally, FIG. 13 illustrates a situation where the DL/UL ratio of the 16m TDD frame is set to 3:5 with respect to LTE TDD configuration 5. Furthermore, the LTE TDD configurations 6 to 8 that have not been illustrated may also be illustrated as shown in FIG. 8 to FIG. 13 in accordance with Table 4.

FIG. 14 to FIG. 17 illustrate the relation with an IEEE 802.16m frame, when the LTE TDD DL/UL ratio of Table 4 according to an embodiment of the present invention corresponds to 2:2.

The same principles as those of FIG. 8 to FIG. 13 are applied in FIG. 14 to FIG. 17. More specifically, the maximum portion that can be occupied by the DL portion of the 16m frame is up to the length of DL 1 symbol+DwPTS+GP of the LTE TDD, and when the 16m frame exceeds this region, a particular situation of having to perform puncturing on the corresponding symbol occurs. According to the embodiment of the present invention, when the LTE TDD DL/UL ratio is 2:2, optimization may be performed at a level of puncturing 1-2 OFDM symbols. The frame offset for all LTE TDD configurations (configuration 0 to configuration 8) is equally set to 4000 us.

Figure 14:
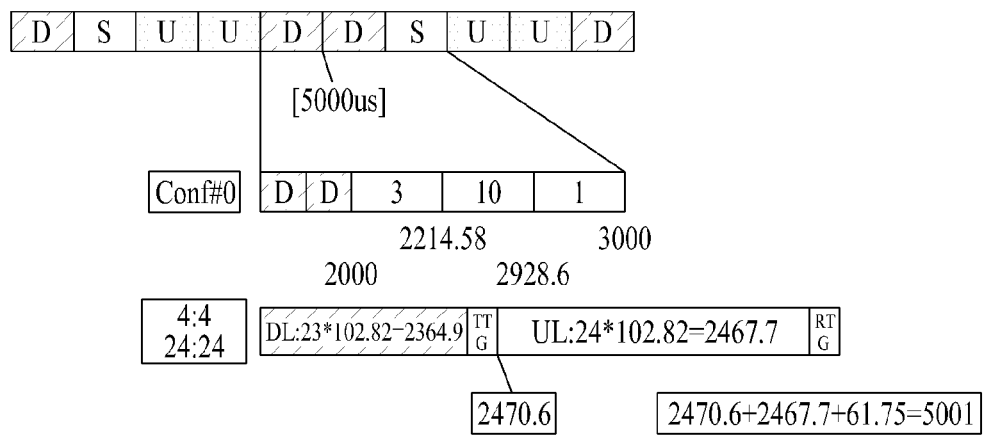
FIG. 14 to FIG. 17 illustrate the relation with an IEEE 802.16m frame, when the LTE TDD DL/UL ratio of Table 4 according to an embodiment of the present invention corresponds to 2:2.
Figure 15:
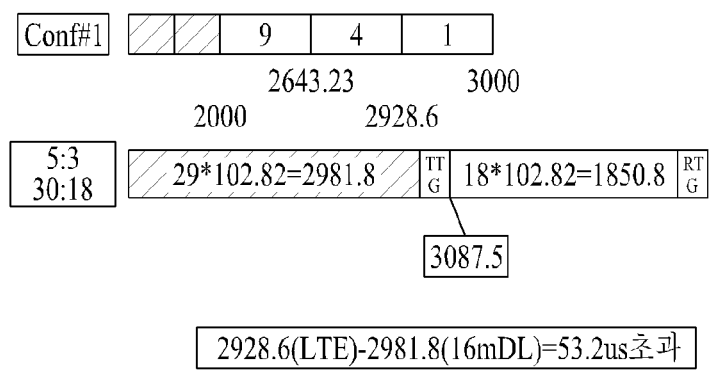
Figure 16:
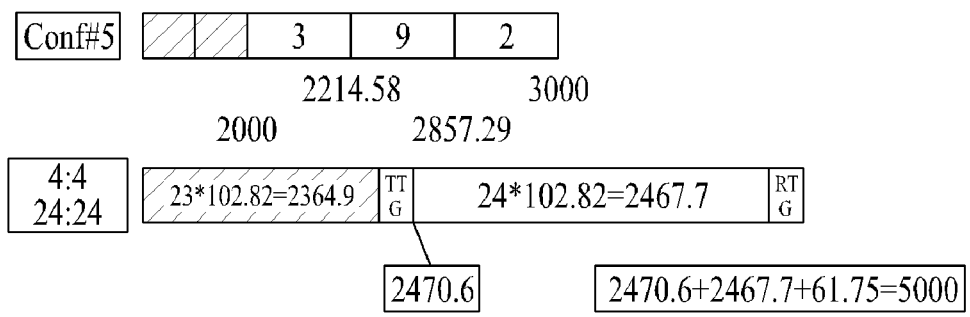
Figure 17:
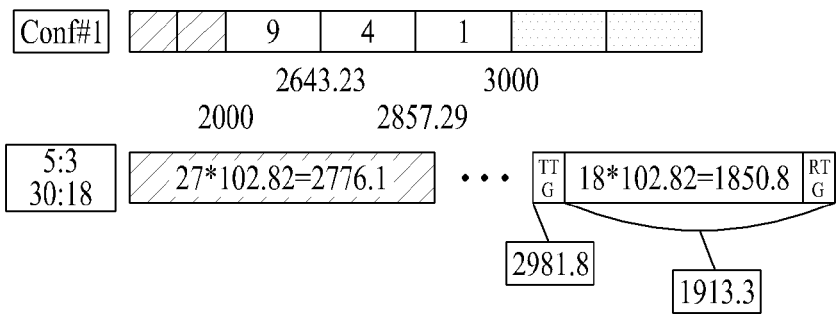

FIG. 14 to FIG. 17 all correspond to cases where the DL/UL ratio of the LTE TDD frame is 2:2. Most particularly, FIG. 14 illustrates a situation where the DL/UL ratio of the 16m TDD frame is set to 4:4 with respect to LTE TDD configuration 0. FIG. 15 illustrates a situation where the DL/UL ratio of the 16m TDD frame is set to 5:3 with respect to LTE TDD configuration 1. FIG. 16 illustrates a situation where the DL/UL ratio of the 16m TDD frame is set to 4:4 with respect to LTE TDD configuration 5. FIG. 17 illustrates a situation where the DL/UL ratio of the 16m TDD frame is set to 5:3 with respect to LTE TDD configuration 6.

Furthermore, the situations that have not been illustrated may also be illustrated as shown in FIG. 14 to FIG. 1n in accordance with Table 4. More specifically, configurations 2, 3, and 4 are all identical to configuration 1 of FIG. 14. Also, configurations 7 and 8 may be applied identically as the situation of configuration 6.

FIG. 18 to FIG. 26 illustrate the relation with an IEEE 802.16m frame, when the LTE TDD DL/UL ratio of Table 4 according to an embodiment of the present invention corresponds to 3:1, and when configuration 0 to configuration 8 are used.

According to the embodiment of the present invention, the number of OFDM symbols that ate punctured when the LTE TDD DL/UL ratio is 3:1 may be set to be equal to or less that 3-4 OFDM symbols. Furthermore, the frame offset for all cases (or situations) is equally set to 3000 us.

Figure 18:
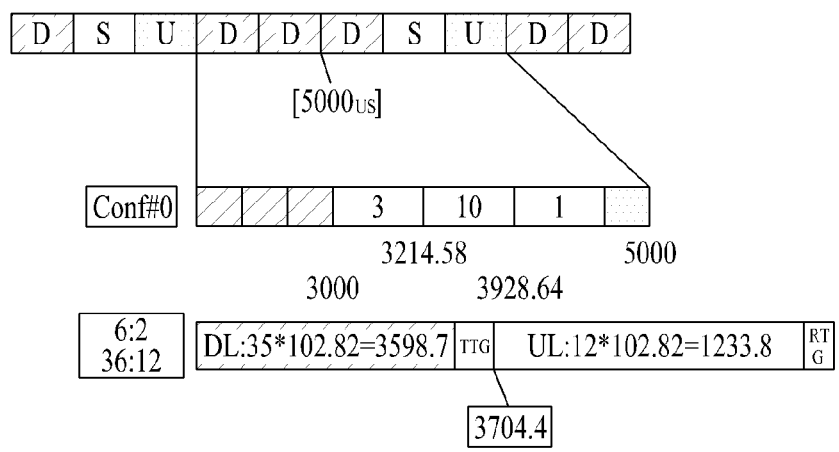
FIG. 18 to FIG. 26 illustrate the relation with an IEEE 802.16m frame, when the LTE TDD DL/UL ratio of Table 4 according to an embodiment of the present invention corresponds to 3:1, and when configuration 0 to configuration 8 are used.
Figure 19:
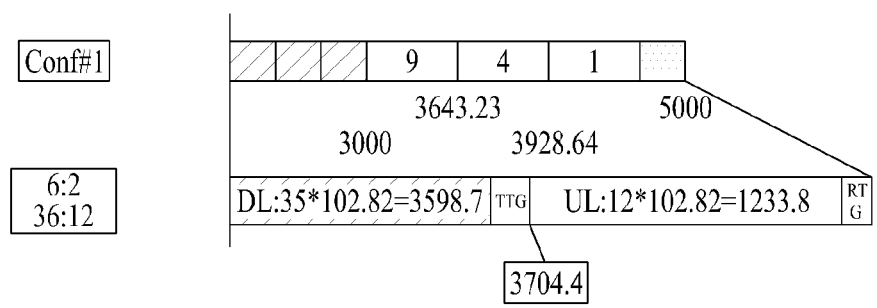
Figure 20:
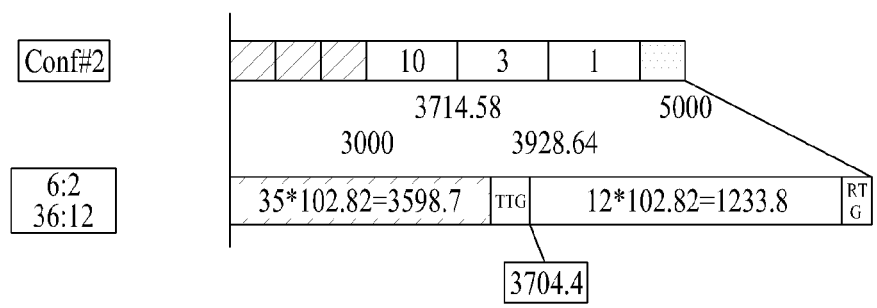
Figure 21:
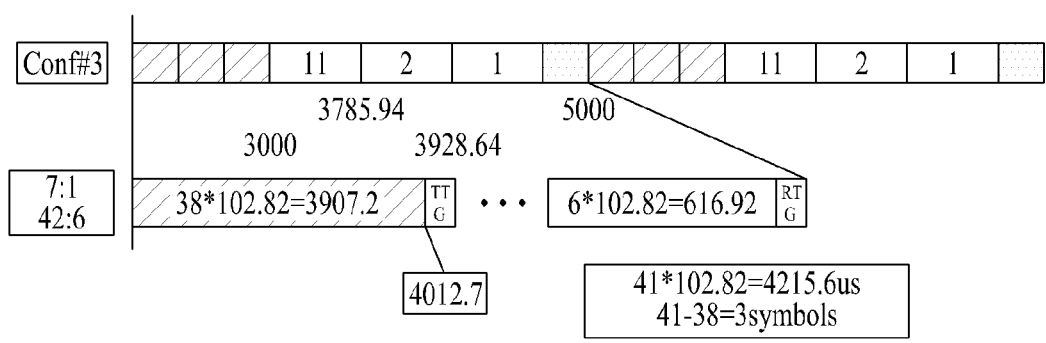
Figure 22:
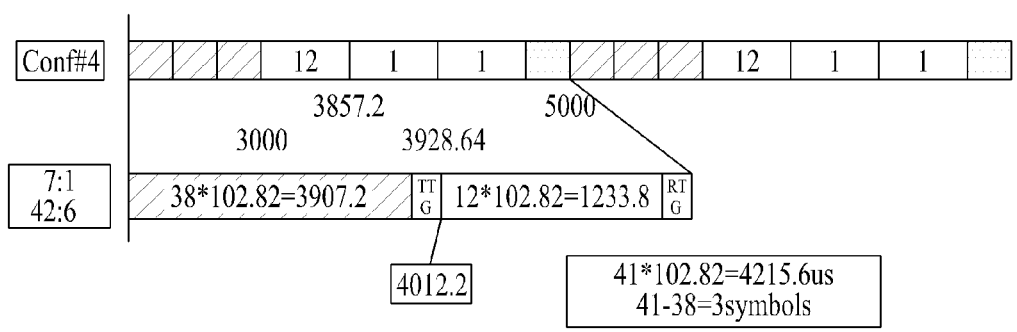
Figure 23:
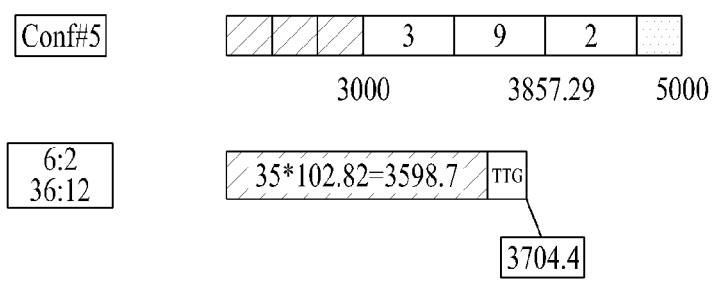

*FIG. 18 to FIG. 26 all correspond to cases where the DL/UL ratio of the LTE TDD frame is 3:1. Most particularly, FIG. 18 illustrates a situation where the DL/UL ratio of the 16m TDD frame is set to 6:2 with respect to LTE TDD configuration 0. FIG. 19 illustrates a situation where the DL/UL ratio of the 16m TDD frame is set to 6:2 with respect to LTE TDD configuration 1. Also, FIG. 20 illustrates a situation where the DL/UL ratio of the 16m TDD frame is set to 6:2 with respect to LTE TDD configuration 2. FIG. 21 illustrates a situation where the DL/UL ratio of the 16m TDD frame is set to 7:1 with respect to LTE TDD configuration 3. Also, FIG. 22 illustrates a situation where the DL/UL ratio of the 16m TDD frame is set to 7:1 with respect to LTE TDD configuration 4. FIG. 23 illustrates a situation where the DL/UL ratio of the 16m TDD frame is set to 6:2 with respect to LTE TDD configuration 5.

Figure 24:
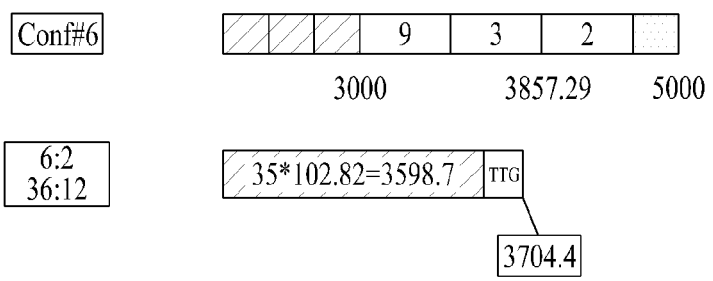
Figure 25:
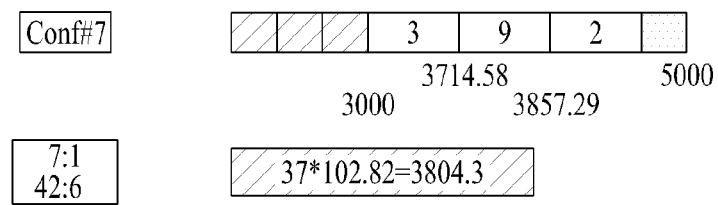
Figure 26:
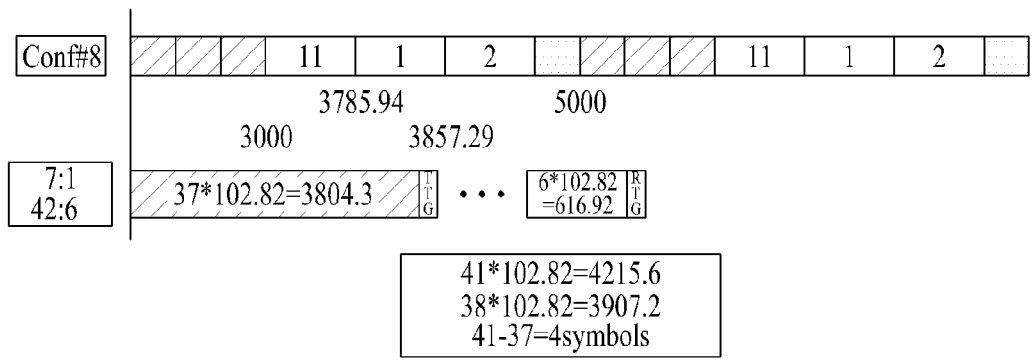

Additionally, FIG. 24 illustrates a situation where the DL/UL ratio of the 16m TDD frame is set to 6:2 with respect to LTE TDD configuration 6. FIG. 25 illustrates a situation where the DL/UL ratio of the 16m TDD frame is set to 7:1 with respect to LTE TDD configuration 7. And, finally, FIG. 26 illustrates a situation where the DL/UL ratio of the 16m TDD frame is set to 7:1 with respect to LTE TDD configuration 8.

Meanwhile, Table 5 shown below indicates the optimization of the 16m frame structure using the same method as that of Table 4 upon reference to Table 3, when the LTE TDD system uses the extended CP.

TABLE 5

| | | | | LTE TDD DL/UL Ratio (Extended CP) | | | | |
|---|---|---|---|---|---|---|---|---|
| | | | | 1:3 | | 2:2 | | 3:1 |
| | | | | CP length for IEEE 802.16 m TDD system | | | | |
| | | | | 1/8 Tu | | 1/8 Tu | | 1/8 Tu |
| | | | | DL/UL ratio within IEEE 802.16 m TDD 5 ms frame and number of OFDM symbols being punctured within 5 ms frame | | | | |
| | The number of OFDM symbols in LTE TDD with extended CP | | | DL (1sym) + DwPTS + GP | | DL (2sym) + DwPTS + GP | | DL (3sym) + DwPTS + GP |
| Configuration Index | DwPTS | GP | UpPTS | | | | | |
| 0 | 250.0 | 666.7 | 83.3 | 1916.67 | 3:5 1749.9 (DL) None | 2916.67 | 4:4 2364.9 (DL-23) None | 3916.67 | 6:2 3598.2 (DL 35) None 7:1 3907.1 (DL 41) None |
| 1 | 666.7 | 250.0 | 83.3 | 1916.67 | 3:5 1747.9 (DL) None | 2916.67 | 5:5 2981.8 (DL 29) 2879.0 (DL 28) 29 − 28 = 1 | 3916.67 | 6:2 3598.2 (DL 35) None Enters GP when added up to TTG 7:1 3907.1 (DL 41) None |
| 2 | 750.0 | 166.7 | 83.3 | 1916.67 | 3:5 1747.9 (DL) None | 2916.67 | 5:3 2981.8 (DL) 29 − 28 = 1 | 3916.67 | 7:1 3907.1 (DL 41) None |

TABLE 5-continued

| | | | | LTE TDD DL/UL Ratio (Extended CP) | | | | |
|---|---|---|---|---|---|---|---|---|
| | | | | 1:3 | | 2:2 | | 3:1 |
| | | | | CP length for IEEE 802.16 m TDD system | | | | |
| | | | | 1/8 Tu | | 1/8 Tu | | 1/8 Tu |
| | | | | DL/UL ratio within IEEE 802.16 m TDD 5 ms frame and number of OFDM symbols being punctured within 5 ms frame | | | | |
| Configuration | The number of OFDM symbols in LTE TDD with extended CP | | | DL (1sym) + DwPTS + GP | | DL (2sym) + DwPTS + GP | | DL (3sym) + DwPTS + GP |
| Index | DwPTS | GP | UpPTS | | | | | |
| 3 | 833.3 | 83.3 | 83.3 | 1916.67 | 3:5 1747.9 (DL) None | 2916.67 | 5:3 2981.8 (DL) 29 − 28 = 1 | 3916.67 | 7:1 3907.1 (DL 41) None |
| 4 | 250.0 | 583.3 | 166.7 | 1833.33 | 3:5 1747.9 (DL) None | 2833.33 | 4:4 2364.9 (DL) None | 3833.33 | 6:2 3598.2 (DL 35) None |
| 5 | 666.7 | 166.7 | 166.7 | 1833.33 | 3"5 1747.9 (DL) None | 2833.33 | 5:3 2981.8 (DL 29) 2776.1 (DL 27) 29 − 27 = 2 | 3833.33 | 6:2 3598.2 (DL 35) None |
| 6 | 750.0 | 83.3 | 166.7 | 1833.33 | 3:5 1747.9 (None) | 2833.33 | 5:3 2981.8 (DL 29) 2776.1 (DL 27) 29 − 27 = 2 | 3833.33 | 7:1 4215.6 (DL 41) 3907.2 (DL 37) 41 − 37 = 4 |

As shown in Table 5, when the LTE TDD DL/UL ratio is 1:3, the 16m frame may be optimized by eliminating the puncturing symbols so that the DL/UL ratio can become 3:5. When the LTE TDD DL/UL ratio is 2:2, puncturing symbols may occur, and the ratio for minimizing the number of puncturing symbols is indicated in Table 5. And, the figures marked in bold fonts in Table 5 indicate the number of symbols. When the LTE TDD DL/UL ratio is 3:1, with the exception of configuration 6, the ratio of the 16m may be determined so that there are no puncturing symbols.

Although the frame offset is not mentioned in Table 5, the frame offset may have the same value in accordance with the 3 different DL/UL ratios of the LTE TDD system, as shown in Table 4.

Hereinafter, as a preferred embodiment of the present invention, a method of determining the 16m frame by delaying the 16m frame within the RTG range, so as to minimize the puncturing caused by a non-conformity between the conventional system and the time domain, will be described in detail.

Figure 27:
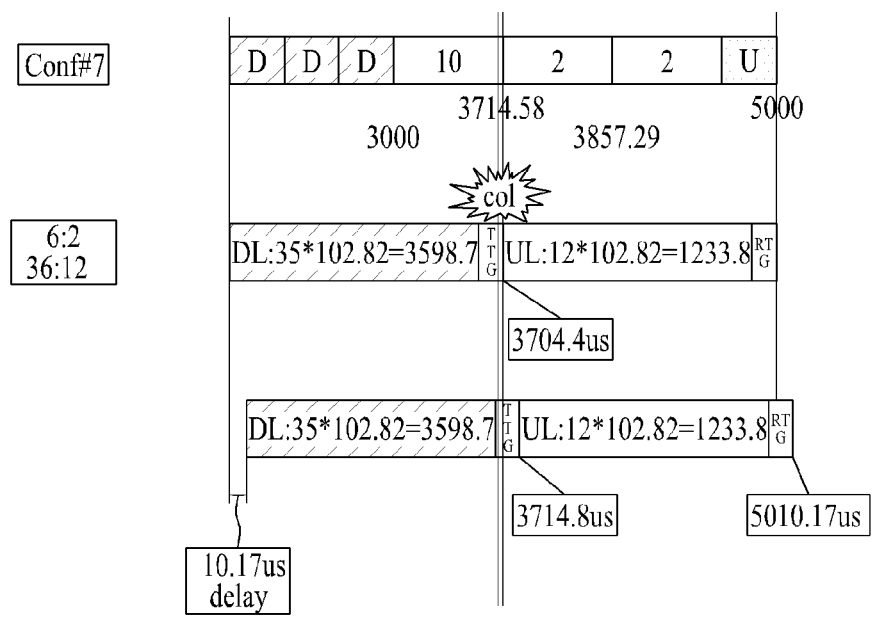
FIG. 27 illustrates a method of establishing an IEEE 802.16m frame by delaying the IEEE 802.16m frame within an RTG range so as to be aligned with the heterogeneous TDD system according to a preferred embodiment of the present invention.

FIG. 27 illustrates a method of establishing an IEEE 802.16m frame by delaying the IEEE 802.16m frame within an RTG range so as to be aligned with the heterogeneous TDD system according to a preferred embodiment of the present invention.

Most particularly, among the details specified in Table 4, FIG. 27 illustrates the case of configuration 7 when the LTE TDD DL/UL ratio is 3:1. As described above, in accordance with Table 4, the LTE TDD system should puncture 4 symbols, when using configuration 7 with respect to the DL/UL ratio of 3:1, and when using the 16m frame DL/UL ratio of 7:1 (42:6). However, in the same situation, by using the 16m frame DL/UL ratio of 6:2 (36:12), and by delaying the 16m frame to a predetermined degree, as shown in FIG. 27, settings may be made so that there are no punctured symbols.

In principle, when the LTE TDD system uses configuration 7 so that the DL/UL ratio can become 3:1, even when the 16m frame DL/UL ratio of 6:2 is used, a collision may occur between the two frames, as shown in the mid-portion of FIG. 27. Therefore, according to the embodiment of the present invention, as shown in the lower portion of FIG. 27, in order to prevent collision in the UL Portion of the 16m, the present invention proposes a method of delaying the 16m frame within the RTG length range.

At this point, the degree of delay may be acquired within a range satisfying the following equation.

$$\text{Delay} = 5000\ us - (DL_{16m} + TTG_{16m} + UL_{16m}) \leq RTG_{16m},$$
$$\text{Delay} + DL_{16m} + TTG_{16m} \geq DL\_{LTE} + DwPTS\_{LTE} \quad [\text{Equation 1}]$$

As described above, by delaying the 16m frame, a frame may be designed so that there is no puncturing (or so that the puncturing can be minimized) in the 16m frame.

As described above, the detailed description of the disclosed preferred embodiments of the present invention is provided so that anyone skilled in the art can realize and carry out the present invention. In the above description, although the present invention is described with reference to the preferred embodiments of the present invention, it will be apparent to those skilled in the art that various modifications and variations can be made in the present invention without departing from the spirit or scope of the inventions. Therefore, the present invention is not intended to limit the present invention to the embodiments presented herein. Instead, it is intended that the present invention grants a broadest range matching the principles and new characteristics disclosed herein.

INDUSTRIAL APPLICABILITY

As described above, in each embodiment of the present invention, a TD-SCDMA (LCR-TDD) system or 3GPP LTE TDD system is given as an example of the conventional heterogeneous TDD system, and an IEEE 802.16m system is given as an example of the new system, and the descriptions of the same are given in detail. However, the present invention is not required to be limited to the given example. And, the present invention may be used as a method of efficiently establishing a frame based upon the same principles in an arbitrary telecommunications system.

What is claimed is:

1. In a situation of coexisting heterogeneous systems including a first system and a second system, in a method of establishing a time domain structure of a second frame used for a Time Division Duplex (TDD) mode of the second system, so that the second frame can coexist with a first frame for a TDD mode of the first system, the method of establishing a time domain structure of a frame comprising:
    an information acquiring step for acquiring type information of the first system being supported and information on a first ratio, wherein the first ratio corresponds to a ratio of a downlink section length of the first frame structure to an uplink section length of the first frame structure;
    a second frame structure establishing step for establishing a second frame structure for the second system based upon the acquired information; and
    a ratio determining step for determining a second ratio, wherein the second ratio corresponds to a ratio of a downlink section length of the second frame structure to an uplink section length of the second frame structure.

2. The method of claim 1, wherein the ratio determining step comprises a step of setting-up a sum of the downlink section and a transmit transition gap (TTG) of the second frame or a sum of the downlink section, TTG, and a receive transition gap (RTG) of the second frame, so that the sum can be equal to or greater than a sum of the downlink section and a downlink pilot time slot (DwPTS) of the first frame.

3. The method of claim 1, wherein, in the ratio determining step, when a sum of the receive transition gap (RTG), downlink section, and transmit transition gap (TTG) of the second frame is greater than a sum of the downlink section, downlink piloting time slot (DwPTS), and guard period (GP) of the first frame, a predetermined number of OFDM symbols are excluded from a transmission.

4. The method of claim 1, wherein the ratio determining step further comprises:
    a step of establishing a frame offset from a starting point of the first frame of the second frame.

5. The method of claim 4, wherein the first system corresponds to an LCR-TDD (low-chip-rate time division duplex) system, wherein the second system corresponds to an IEEE 802.16m system, and wherein a cyclic prefix (CP) length of the second frame is equal to ⅛ valid OFDM symbol time (Tu),
    wherein the second ratio is set to 7:1 when the first ratio is set to 6:1, wherein the second ratio is set to 6:2 when the first ratio is set to 5:2, wherein the second ratio is set to 5:3 when the first ratio is set to 4:3, and
    wherein each of the ratios used to set the first and second ratios corresponds to a ratio of a downlink section length to an uplink section length.

6. The method of claim 5, wherein among the second frame structure, 1 OFDM symbol is excluded from the transmission when the first ratio is 6:1, wherein 2 OFDM symbols are excluded from the transmission when the first ratio is 5:2, and wherein 3 OFDM symbols are excluded from the transmission when the first ratio is 4:3.

7. The method of claim 1, wherein the first system corresponds to a 3GPP LTE TDD system, wherein the second system corresponds to an IEEE 802.16m system, and wherein a cyclic prefix (CP) length of the second frame is equal to ⅛ valid OFDM symbol time (Tu), and
    wherein the information acquiring step comprises a step of additionally acquiring CP length information of the first frame and configuration index information of the first frame in the 3GPP LTE TDD system.

8. The method of claim 7, wherein, when the CP length of the first frame corresponds to a normal CP and when the first ratio is 1:3,
    the second ratio is set to 2:6 or 3:5 when the configuration index of the first frame is 0, wherein the second ratio is set to 3:5 when the configuration index of the first frame is 1, wherein the second ratio is set to 3:5 when the configuration index of the first frame is 2, wherein the second ratio is set to 3:5 when the configuration index of the first frame is 3, wherein the second ratio is set to 3:5 when the configuration index of the first frame is 4, wherein the second ratio is set to 2:6 or 3:5 when the configuration index of the first frame is 5, wherein the second ratio is set to 3:5 when the configuration index of the first frame is 6, wherein the second ratio is set to 3:5 when the configuration index of the first frame is 7, wherein the second ratio is set to 3:5 when the configuration index of the first frame is 8, and
    wherein each of the ratios used to set the first and second ratios corresponds to a ratio of a downlink section length to an uplink section length.

9. The method of claim 7, wherein, when the CP length of the first frame corresponds to a normal CP and when the first ratio is 2:2,
    the second ratio is set to 4:4 when the configuration index of the first frame is 0, wherein the second ratio is set to 5:3 when the configuration index of the first frame is 1, wherein the second ratio is set to 5:3 when the configuration index of the first frame is 2, wherein the second ratio is set to 5:3 when the configuration index of the first frame is 3, wherein the second ratio is set to 5:3 when the configuration index of the first frame is 4, wherein the second ratio is set to 4:4 when the configuration index of the first frame is 5, wherein the second ratio is set to 5:3 when the configuration index of the first frame is 6, wherein the second ratio is set to 5:3 when the configuration index of the first frame is 7, wherein the second ratio is set to 5:3 when the configuration index of the first frame is 8, and
    wherein each of the ratios used to set the first and second ratios corresponds to a ratio of a downlink section length to an uplink section length.

10. The method of claim 7, wherein, when the CP length of the first frame corresponds to a normal CP and when the first ratio is 3:1,
    the second ratio is set to 6:2 when the configuration index of the first frame is 0, wherein the second ratio is set to 6:2 when the configuration index of the first frame is 1, wherein the second ratio is set to 6:2 when the configuration index of the first frame is 2, wherein the second ratio is set to 7:1 when the configuration index of the first frame is 3, wherein the second ratio is set to 7:1 when the configuration index of the first frame is 4, wherein the second ratio is set to 6:2 when the configuration index of the first frame is 5, wherein the second ratio is set to 6:2 when the configuration index of the first frame is 6, wherein the second ratio is set to 7:1 or 6:2 when the configuration index of the first frame is 7, wherein the second ratio is set to 7:1 when the configuration index of the first frame is 8, and wherein each of the ratios used to set the first and second ratios corresponds to a ratio of a downlink section length to an uplink section length.

11. The method of claim 10, wherein the second frame is set-up to have a frame offset of 300 us from a starting point of the first frame.

12. The method of claim 11, wherein, when the configuration index of the first frame is 7 and when the second ratio is 6:2, the second frame is set-up to be delayed for a predetermined time starting from a point corresponding to the frame offset at the starting point of the first frame within a receive transition gap (RTG) range of the second frame.

13. The method of claim 7, wherein, when the CP length of the first frame corresponds to an extended CP and when the first ratio is 1:3, the second ratio is set to 3:5 when the configuration index of the first frame is any one of 0 to 6, and wherein each of the ratios used to set the first and second ratios corresponds to a ratio of a downlink section length to an uplink section length.

14. The method of claim 7, wherein, when the CP length of the first frame corresponds to an extended CP and when the first ratio is 2:2, the second ratio is set to 4:4 when the configuration index of the first frame is 0 or 6, and wherein the second ratio is set to 5:3 when the configuration index of the first frame is any one of 1, 2, 3, 5, and 6, and wherein each of the ratios used to set the first and second ratios corresponds to a ratio of a downlink section length to an uplink section length.

15. The method of claim 7, wherein, when the CP length of the first frame corresponds to an extended CP and when the first ratio is 3:1, the second ratio is set to 6:2 or 7:1 when the configuration index of the first frame is 0, wherein the second ratio is set to 6:2 or 7:1 when the configuration index of the first frame is 1, wherein the second ratio is set to 7:1 when the configuration index of the first frame is 2, wherein the second ratio is set to 7:1 when the configuration index of the first frame is 3, wherein the second ratio is set to 6:2 when the configuration index of the first frame is 4, wherein the second ratio is set to 6:2 when the configuration index of the first frame is 5, wherein the second ratio is set to 7:1 when the configuration index of the first frame is 6, and wherein each of the ratios used to set the first and second ratios corresponds to a ratio of a downlink section length to an uplink section length.

* * * * *